W. H. PISANI.
PERFORATING AND SOLDER AND FLUX FEEDING MACHINE.
APPLICATION FILED APR. 18, 1917.

1,290,341.

Patented Jan. 7, 1919.
5 SHEETS—SHEET 1.

WITNESSES:
C. S. Evans
J. B. Gardner

INVENTOR.
W. H. PISANI.
BY White & Prost
HIS ATTORNEYS

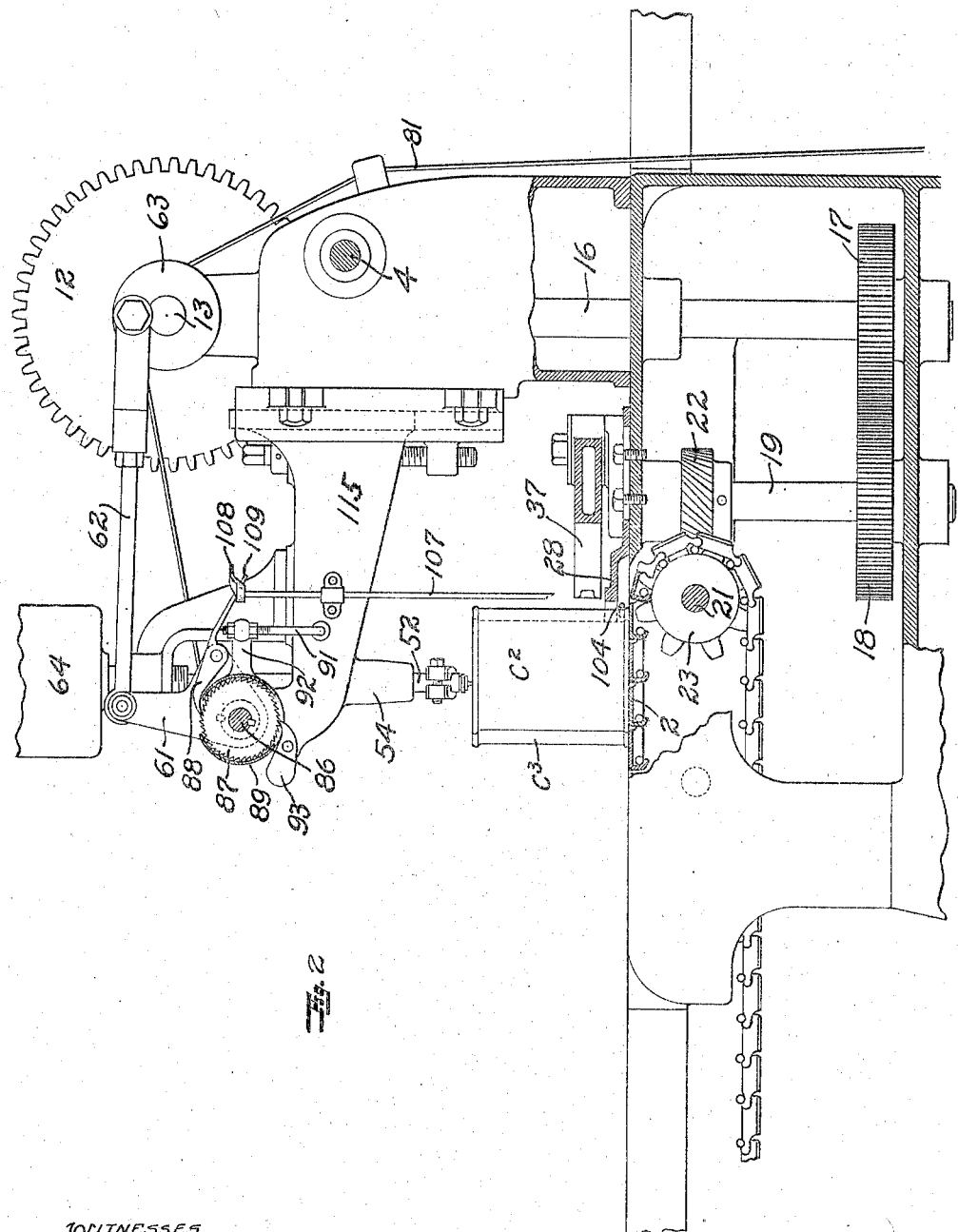

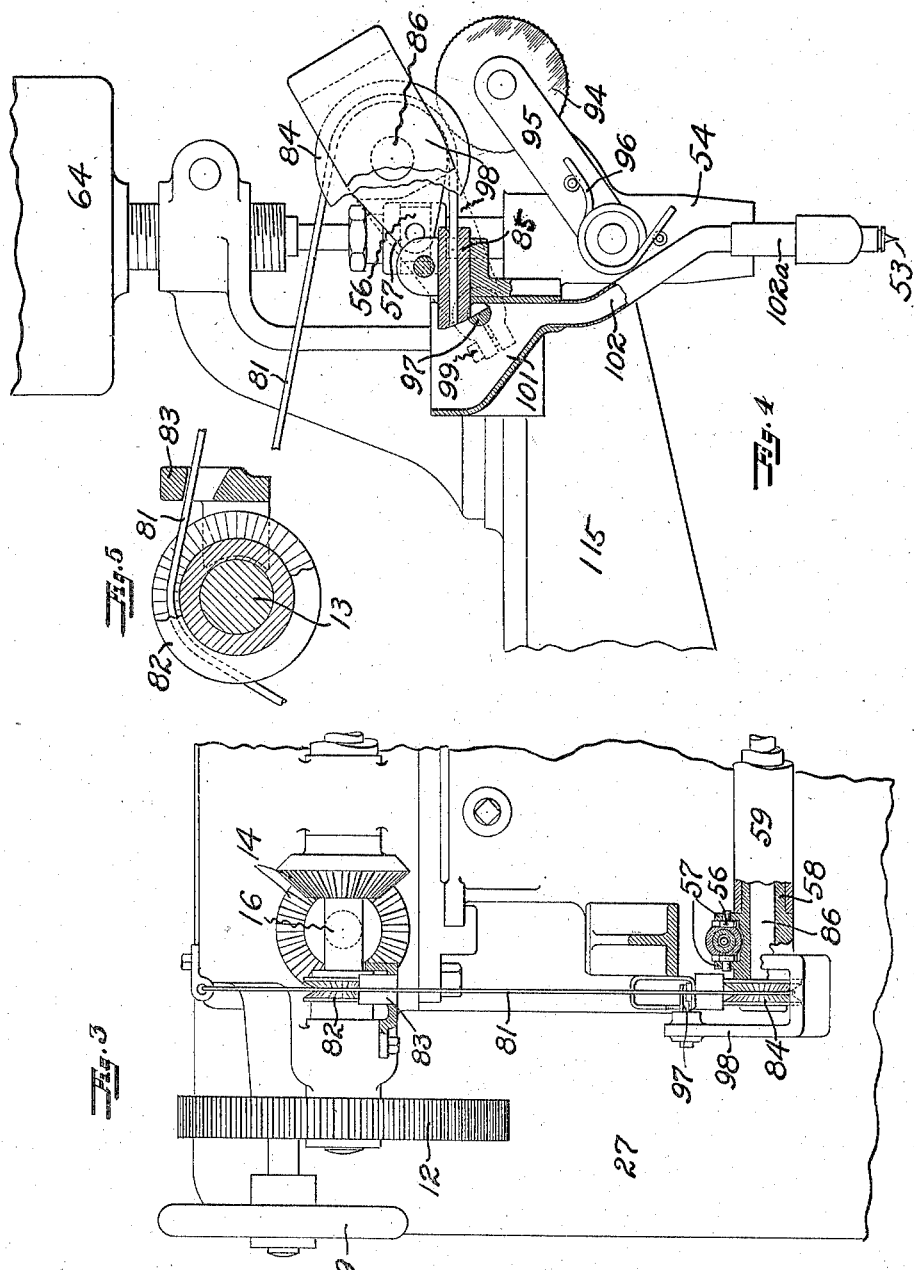

W. H. PISANI.
PERFORATING AND SOLDER AND FLUX FEEDING MACHINE.
APPLICATION FILED APR. 18, 1917.
1,290,341.
Patented Jan. 7, 1919.
5 SHEETS—SHEET 4.
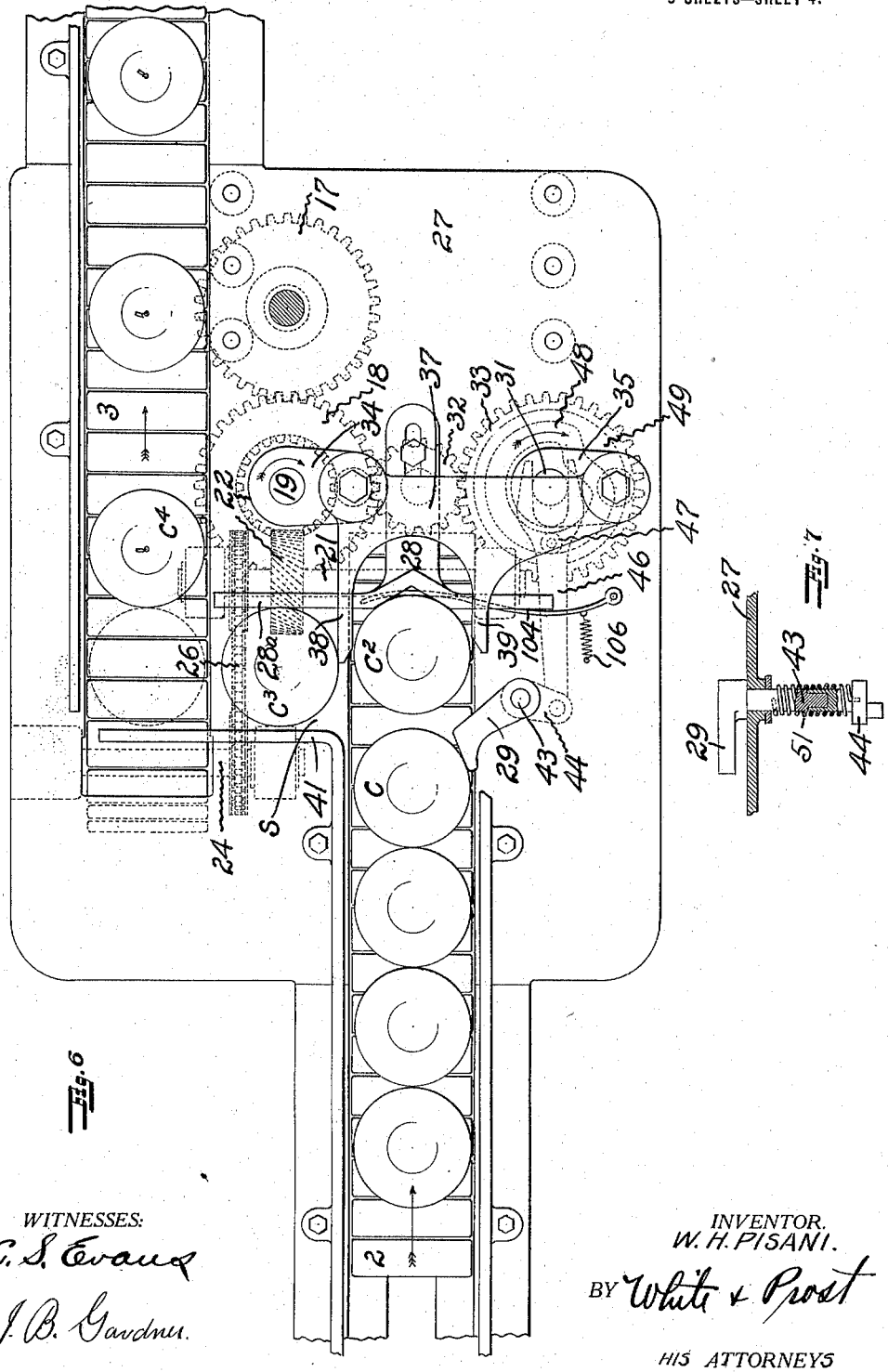
WITNESSES:
INVENTOR.
W. H. PISANI.
BY White & Prost
HIS ATTORNEYS

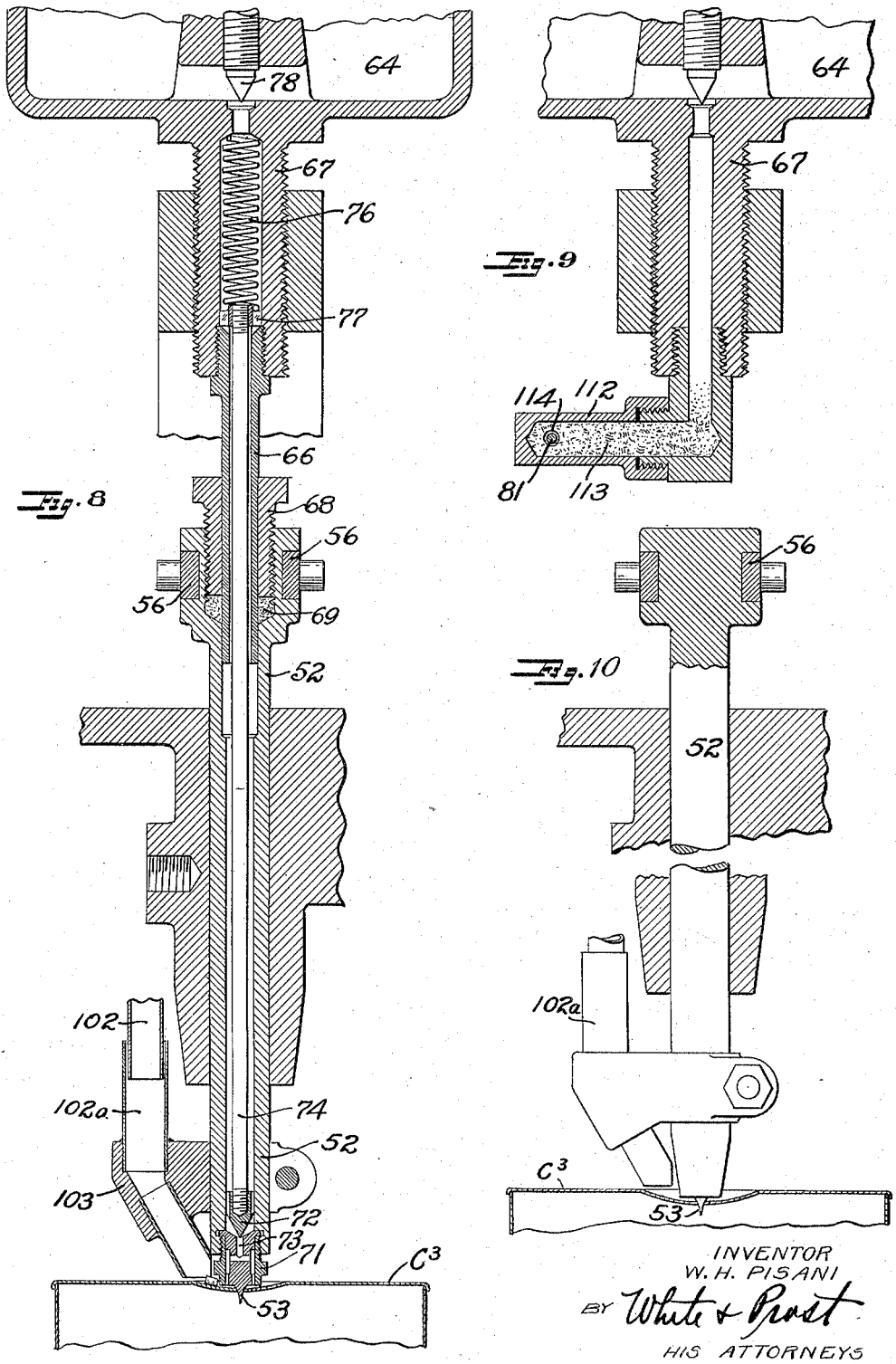

UNITED STATES PATENT OFFICE.

WILLIAM H. PISANI, OF SAN FRANCISCO, CALIFORNIA, ASSIGNOR TO MAX J. BRANDENSTEIN, MANFRED BRANDENSTEIN, AND EDWARD BRANDENSTEIN, ALL OF SAN FRANCISCO, CALIFORNIA, COPARTNERS DOING BUSINESS UNDER THE FIRM-NAME OF M. J. BRANDENSTEIN & CO.

PERFORATING AND SOLDER AND FLUX FEEDING MACHINE.

1,290,341.      Specification of Letters Patent.      Patented Jan. 7, 1919.

Application filed April 18, 1917. Serial No. 163,061.

*To all whom it may concern:*

Be it known that I, WILLIAM H. PISANI, a citizen of the United States, and a resident of the city and county of San Francisco, State of California, have invented a new and useful Perforating and Solder and Flux Feeding Machine, of which the following is a specification.

My invention relates to machines for operating on cans.

An object of my invention is to provide a machine for perforating the top of a can preparatory to exhausting the air therefrom.

Another object of my invention is to provide a machine in which a portion of solder and flux are placed adjacent the perforation in the top of a can preparatory to sealing the perforation.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings.

Fig. 2 is a right side elevation of the machine shown in Fig. 1.

Fig. 3 is a plan view of a portion of the machine.

Fig. 4 is a left side elevation of a portion of the machine.

Fig. 5 is a detail of a portion of the machine.

Fig. 6 is a plan view of the table of the machine, the head of the machine being removed.

Fig. 7 is a detail of a portion of the mechanism.

Fig. 8 is a vertical section through the punch rod and flux feeding mechanism.

Figs. 9 and 10 are views showing a modified form of the structure shown in Fig. 8.

Figure 1:
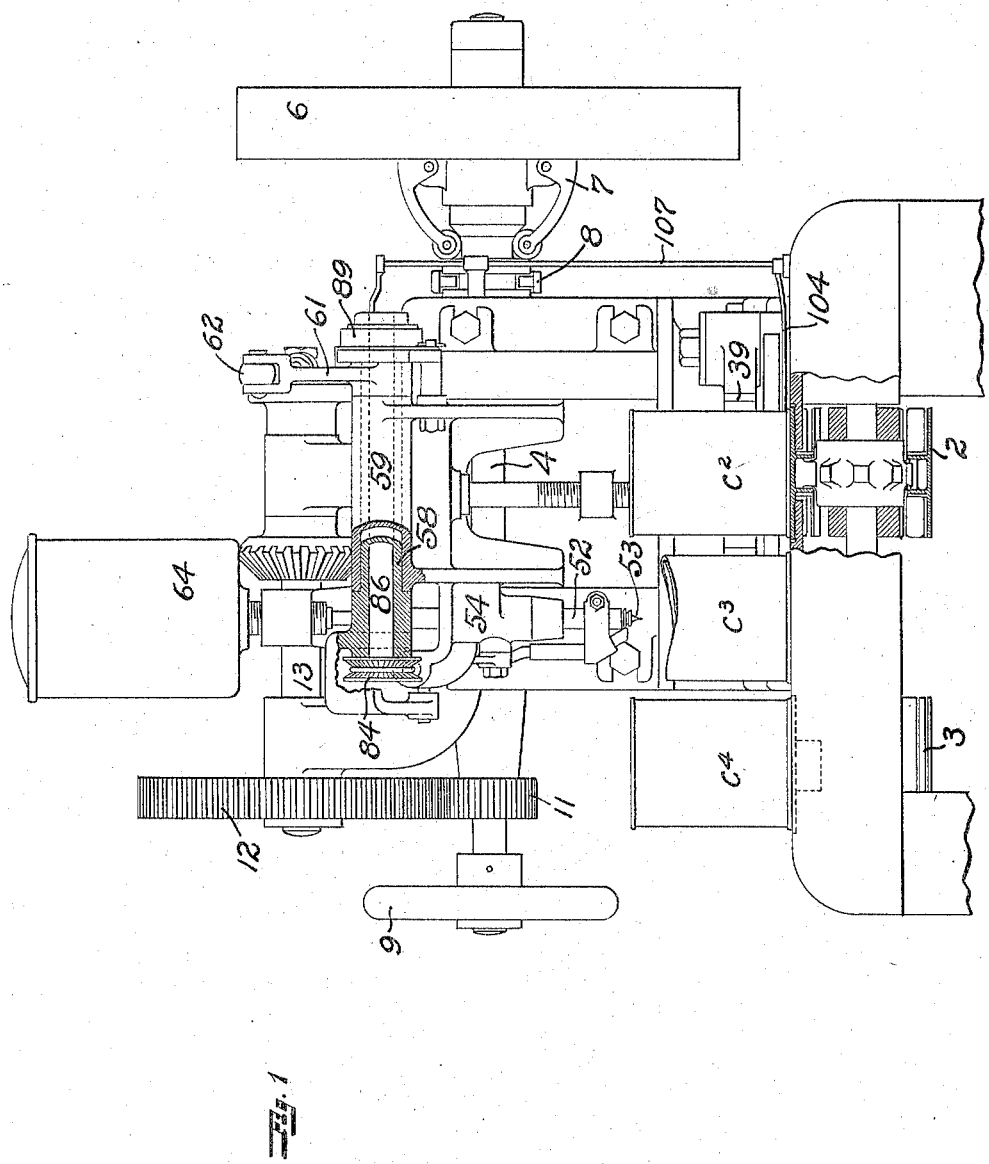
Figure 1 is a front elevation of the machine of my invention. Portions are broken away to better disclose the structure.

Certain food products, such as coffee, reach the consumer in better condition and with the aroma and flavor more fully preserved if the receptacles in which the product is contained are vacuumized before they are sealed. The present invention has to do with a machine for carrying out certain steps in the process which produces a sealed and vacuumized receptacle. The process consists of filling the can with the coffee, seaming on the top, perforating the top, exhausting the air from the can and closing the perforation with solder to preserve the vacuum. The present invention does not include means for accomplishing the seaming or vacuumizing of the can, but comprises means for delivering the filled and closed cans from the seaming machine, means for feeding the cans from the delivering means to an operating station, means for perforating the top of the can while at this station, means for depositing a small portion of solder together with the necessary flux upon the can top adjacent the perforation, means for removing the can from the operating station, and means for delivering the can with the solder and flux in position thereon to the vacuumizing and soldering machine. In the latter apparatus the can is exhausted of its air and the solder melted to seal the perforation and preserve the vacuum.

In order to make the following description as clear as possible, it will be developed by topics of which the first is

*Feeding the cans into and out of the operating station.*

The cans C, Fig. 6, are received from the seaming machine upon a belt conveyer comprised of the links 2, which conveys them into the machine, where they are displaced from the conveyer 2 to the operating station S. After the top of the can is punctured and the solder and flux deposited, the can is pushed off of the station S upon the conveyer 3 which carries the cans out of the machine and to the vacuumizing apparatus. Power to drive the conveyers is derived from the main driving shaft 4, Fig. 1, mounted in suitable bearings in the head of the machine. A pulley 6 is belted to any convenient source of power and clutch mechanism 7 of the usual type operated by the yoke 8 in the well known manner provides means for connecting and disconnecting the driving pulley 6 from the main shaft 4. The shaft 4 extends through the head of the machine and bears a hand-wheel 9 upon its outer end so that the shaft can be turned over by hand when it is necessary to do so.

Spur gears 11 and 12 connect the shaft 4 with the shaft 13, Figs. 1 and 3, and bevel gears 14 connect the latter to the vertical shaft 16 which passes down through the head of the machine, Fig. 2, and by means of spur gears 17 and 18 drives the vertical shaft 19, Figs. 2 and 6. A horizontal shaft 21 is driven from the shaft 19 by the spiral gears 22 and upon this shaft is secured the driving sprocket 23 of the incoming conveyer 2. The driving sprocket for the outgoing conveyer 3 is secured to the shaft 24, Fig. 6, driven by the shaft 21 through the chain 26 arranged on suitable sprockets.

Adjustably secured upon the table 27 of the machine is a fixed stop 28 having a shallow V-shaped recess therein. The stop is positioned so that a can $C^2$ upon the incoming conveyer, having passed the movable stop 29, is stopped and retained in position opposite the operating station S, the conveyer sliding under the can.

Means are provided for moving the cans from the stopped position on the conveyer to the operating station S. A vertical shaft 31, Fig. 6, similar to shaft 19, is suitably journaled in the machine and is driven by the gears 32 and 33 at the same speed and in the same direction as the shaft 19. Secured to the upper ends of the shafts 19 and 31 respectively and extending therefrom in the same direction are cranks 34 and 35. Pivotally mounted upon the cranks in the manner of a connecting rod is a feed yoke 37, formed with the projecting arms 38 and 39. It will be seen that as the two shafts 19 and 31 revolve in synchronism, the cranks 34 and 35 will impart a sweeping rotary motion to the feed yoke. The position of the feed yoke and the proportion of the parts is such that when a can is brought to rest against the stop 28, it lies within the arms 38 and 39, which are then moving toward the can, that is, toward the left of the figure. The can is thus caught between the arms 38 and 39 and swept off of the conveyer upon the operating station S where it is left by the withdrawal of the arms as the feed yoke sweeps around toward the right of the figure. Fig. 6 shows a can $C^3$ in position at station S. The movement of the can and its final position on the station S is also determined by guides between which it moves. Such guides are provided by the extended arm $28^a$ of the stop 28 on one side and on the other side by the guide bar 41. During the interval in which the feed yoke is sweeping around to engage the next can, which in the meantime has been advanced against the stop 28 by the conveyer 2, the can on the station S is perforated and the solder and flux deposited thereon by correlated instrumentalities which will be presently described. On the second sweep (toward the left of the Fig. 6) the feed yoke arm 39 engages the can then lying against the stop 28 and the arm 38 engages the can $C^3$ on the station S, sweeping both forward one step, the second can upon the operating station and the first can off of the station upon the conveyer 3 upon which it is carried out of the machine and into the vacuumizing apparatus. A can $C^4$, Fig. 6, is shown on the outgoing conveyer 3.

Means are provided for intercepting the succession of cans being fed toward the stop 28 and for releasing the following can as soon as the can against the stop is swept onto the station S. Journaled in the table top 27 is a vertical shaft 43 carrying at its upper end the stop 29 and at its lower end the arm 44. The shaft is oscillated to swing the stop 29 into and out of the path of the cans on the incoming conveyer by means of the rod 46 pivoted at one end to the arm 44 and slidably engaging the shaft 31 at the other end. The rod is given a reciprocating motion by a roller 47 mounted thereon and engaging a cam groove 48 formed in the top surface of the disk 49. The shape of the cam is such that the stop 29 is swung out of the path of the leading can C as soon as the arm 39 has passed across the conveyer to sweep the can $C^2$ onto the station S. As soon as the can C passes the stop 29, the stop swings back again to intercept the next succeeding can. Preferably the shaft 43 is formed in two alined portions yieldingly connected rotatably by the spring 51, Fig. 7. This is to permit the stop 29 to yield under accidental pressures rather than crush a can, and to permit the stop to be moved by the operator to pass a can independent of the cam connection.

It will be clear from the above that the feed yoke moves continuously, sweeping a can away from the stop 28 onto the station S and the preceding can from the station S to the outgoing conveyer 3 with each revolution and that the incoming conveyer 2 delivers one can at a time as they are permitted to pass by the stop 29 against the stop 28 in position to be caught by the feed yoke on its next sweep around.

Punch mechanism.

The function of the punch is to perforate the top of the can as it lies on the station S, so that the air can subsequently be exhausted from the can. The punch proper consists essentially of a reciprocating rod 52, Fig. 1, carrying a perforating point 53 at its lower end and mounted in a suitable bearing 54 which is formed on the head of the machine. At its upper end the punch is squared and provided with slide-ways adapted to be engaged by blocks 56, Figs. 4 and 8, pivotally mounted on the end of a bifurcated arm 57, Figs. 3 and 4, which is vibrated to reciprocate the punch rod.

Means are provided for vibrating the arm. The arm is formed integral with the sleeve 58 which is suitably journaled in the bearing 59, Figs. 1 and 3. At its other end the sleeve is provided with a rocker arm 61, Figs. 1 and 2, and this arm is connected by the link 62, Fig. 2, to the crank disk 63 which is arranged on the outer end of the shaft 13. Rotation of the shaft 13 thus is effective to reciprocate the punch rod by means of the link 62, arm 61, sleeve 58, arm 57 and blocks 56, and the timing is such that the punch descends to perforate the can as soon as the latter comes to rest upon the station S.

*Flux feed.*

Coincident with the perforation of the can top a portion of solder and a small quantity of flux are deposited thereon. A flux reservoir 64, Fig. 8, is arranged above the punch rod 52 which is preferably formed hollow. A pipe 66 secured to the hollow stem 67 of the flux reservoir projects into and forms a slidable connection with the upper part of the punch rod. The gland 68 and packing 69 prevent leakage at this connection. The punch head 71 is suitably channeled to allow the flux to flow therethrough when released by the needle 72 which controls the passage 73. The needle 72 is arranged on the end of the rod 74 which extends upwardly through the punch rod and pipe 66, to the spring 76 which tends to hold the rod head 77 down against the upper end of the pipe 66. Both rod head 77 and needle 72 are channeled on the sides to permit the free passage of the flux past them. When the punch is not in its lowermost position the needle 72 is seated to close the passage 73 and prevent the delivery of any flux, but when the punch approaches the lower position, the end of the passage 73 draws away from the rod which is prevented from descending by reason of the head 77 engaging the top of the pipe 66 and a portion of flux flows through the passage 73 and channels in the punch head 71 and falls upon the can top about the perforation. As soon as the punch starts to ascend the needle is seated to close the passage 73, the rod 74 then moving upward with the punch rod against the resistance of the spring 76. The passage from the reservoir is controlled by a manually operated needle valve 78.

*Solder feed.*

Means are provided for depositing a small piece of solder adjacent the aperture coincident with the piercing of the top and the deposit of flux. This means includes means for storing solder wire, means for feeding the wire to a cutter, means for cutting the required quantity of solder from the wire, means for delivering the cut portion of solder upon the can top, and means for interrupting the feed of solder to the cutter when a can is not present upon the operating station.

Preferably the solder is used in the form of wire which is wound on a suitable reel arranged conveniently at the base of the machine. From the reel the wire 81 is led up the side of the machine as shown in Fig. 2, and threaded over a grooved pulley 82, freely mounted on the shaft 13, and through the guide 83, Fig. 5. It then passes toward the front of the machine, (toward the right of Fig. 4) passes around the feed pulley 84 and into the rear of the fixed chuck 85 at the other end of which the portions of solder are severed.

The feed pulley 84 is fixed upon the shaft 86 journaled within the sleeve 58. Upon the other end of the shaft is fixed a ratchet wheel 87 arranged to be moved intermittently by the pawl 88 pivotally mounted upon the arm 61. With each forward movement of the arm 61 which is vibrated by the link 62, the pawl moves the ratchet wheel a certain amount depending upon the adjustment of the interrupted casing 89 in the well known manner. The casing is held in adjusted position by the pivoted rod 91 which is adjustably connected to the arm 92 integral with the casing. With the movement of the ratchet wheel 87 occurs a corresponding turning of the shaft 86 and the feed pulley which thereupon feeds the prescribed length of wire into the chuck. A latch 93 prevents a backward turning of the ratchet wheel.

The wire solder is held in frictional contact with the pulley 84 by a thin wheel 94, Fig. 4, spring-held against the wire by means of the pivoted link 95 and spring 96. Both grooved pulley and spring-pressed wheel are roughened to give a better hold upon the solder.

The means for cutting off the portions of wire solder as it is fed out of the end of the chuck 86 comprises a cutter 97 which moves past the end of the chuck at the proper moment. The cutter is secured to an arm 98, Figs. 3 and 4 which is arched about the feed pulley 84 and connects integrally with the end of the sleeve 58. The rocking of the sleeve therefore effects a swinging of the cutter 97 in an arc of which the axis of the sleeve 58 is the center. The end of the chuck 86 is curved to the same arc and the cutter is adjusted so as to move in contact with the curved chuck end, thus shearing off any solder which may project therefrom.

Preferably the cutter is formed by grinding away approximately one-half of a cylindrical piece, so that the section formed by the grinding is the same curvature as the end of the chuck. A cylindrical end is left on the cutter and this end is seated in a split socket in the arm 98 tightened by a cap screw 99.

Since both arms 57 which actuate the punch rod and arm 98 carrying the cutter are integral with the sleeve 58, the downward movement of the punch rod to perforate the can is accompanied by a downward movement of the cutter across the end of the chuck, severing the projecting solder near the end of the stroke. The severed solder falls into the funnel-like casing 101, Fig. 4, which surrounds the chuck, and through the conduit 102 from the lower end of which it discharges upon the can top adjacent the perforation. The upper section of conduit 102 is secured to the head of the machine, but the lower section 102$^a$, Fig. 8, is secured to the punch rod by the clamp member 103, so that it rises and falls with the punch rod, the conduit section 102$^a$ telescoping upon the upper section of conduit 102.

It will be understood that the solder is cut near the end of the downward movement of the cutter and punch rod, during which the solder feed mechanism is motionless. On the upward movement of the punch rod and cutter, and after the latter has passed the chuck 85, the pawl 88 is permitted by the casing 89 to engage the ratchet wheel 87, thus actuating the solder feed mechanism during the remainder of the upstroke. The next downstroke of the cutter severs the projecting solder, and the cycle is repeated,—feeding solder toward the end of the upstroke of the cutter and punch rod and severing it toward the end of the downstroke.

In case a can is not fed onto the station S, means for preventing the feed of solder are provided. Pivotally mounted upon the table 27, Fig. 6, is a curved arm 104 which projects across the conveyer 2 and is moved toward the stop 28 by the can C² delivered against the stop. If no can is brought to the stop, the arm 104 is held outwardly from the stop by a light spring 106. The position of the arm therefore at the moment of the feeding sweep of the feed yoke is determined by the presence or absence of a can in position to be swept onto the station S. A rod 107, Fig. 2, extends upwardly from the arm 104 and carries at its upper end an arm 108 which is so positioned that when the arm 104, owing to the absence of a can against the stop 28, swings away from the stop, the arm 108 swings into interference with the tail 109 of the pawl 88, lifting the pawl out of engagement with the ratchet wheel 87, and thus preventing the ensuing forward stroke of the arm 61 from actuating the ratchet wheel and the connected shaft 86 and feed pulley 84. No solder is therefore fed from the chuck and none is cut on this stroke of the cutter. The presence of a can against the stop 28 swings the arm 108 out of interference with the tail 109 and the pawl operates the ratchet and feed pulley as already explained.

Modifications.

It is obvious that the tops of the cans may be perforated before being seamed onto the cans and in this case, the sharp point on the punch rod is omitted, the function of the punch rod then merging in that of the flux feed mechanism.

I may prefer to apply the flux direct to the solder before it is cut and in Figs. 9 and 10 I have shown the necessary changes to accomplish this different mode of operation. On the end of the stem 67 of the flux reservoir is arranged a casing 112 in which is arranged a wick 113 designed to be kept saturated with the flux flowing from the reservoir. The casing 112 projects into the path of the wire solder and is provided at its end with apertures 114 through which the wire solder passes, thus contacting with the flux saturated wick 113. The solder is thus covered with flux before it is cut.

In this construction the punch rod is made solid as shown in Fig. 10 and its sole function then is to perforate the can top.

The punch rod and related mechanism are carried upon a bracket 115 which is vertically adjustable upon the head of the machine so that cans of different height may be operated upon.

I claim:

1. In a machine for operating upon a can having a perforated top, means for depositing a portion of solid solder adjacent the perforation, a valve for supplying flux for said solder, and means for opening said valve in time with the deposit of solder on said can top.

2. In a machine for operating upon a can having a perforated top, means for depositing a portion of solid solder and simultaneously therewith, a predetermined portion of flux adjacent the perforation.

3. In a machine for operating upon a can, means for perforating the can and means for simultaneously depositing a portion of solid solder adjacent said perforation.

4. In a machine for operating upon a can, means for perforating the can and means operating simultaneously therewith for severing a portion of solid solder and depositing said portion at a point adjacent said perforation.

5. In a machine for operating upon a can, means for perforating the can, means acting simultaneously with said perforating means for severing a portion of solder, means for depositing said severed portion at a point adjacent said perforation and means for supplying flux for said solder.

6. In a machine for operating upon a can having a perforated top, a solder cutter, means for operating said cutter, means for feeding wire solder to said cutter, means for conducting a piece of cut solder to the can top adjacent the perforation and means for supplying a predetermined amount of flux to said can top coincidently with the deposit of solder thereon.

7. In a machine of the class described, a fixed chuck, a solder cutter adapted to operate in conjunction with said chuck, an oscillatable arm, means operated by the arm when moving in one direction for feeding a portion of solder through said chuck to said cutter, and means operated by the arm when moving in the other direction for operating said cutter.

8. In a machine of the class described, a solder cutter, a punch rod, an oscillatable arm, means operated by the arm when moving in one direction for feeding a portion of solder to said cutter, and means operated by the arm when moving in the other direction for operating said cutter and said punch rod.

9. In a machine of the class described, a solder cutter, a punch rod, an oscillatable arm, means operated by the arm when moving in one direction for feeding a portion of solder to said cutter, means operated by the arm when moving in the other direction for operating said cutter and said punch rod and means for supplying flux for said solder.

10. In a machine for operating on a can having a perforated top, a chuck having a curved end, means for feeding wire solder from the curved end of said chuck, a cutter movable in an arc past the curved end of said chuck for severing the solder projecting from said chuck and means for conducting the severed piece of solder to a point adjacent said perforation.

11. In a machine for operating on a can having a perforated top, a chuck having a curved end, means for feeding wire solder from the curved end of said chuck, a cutter movable in an arc past the curved end of the chuck for severing the solder projecting from said chuck, means for conducting the severed piece of solder to a point adjacent said perforation and means for supplying flux for said solder.

12. In a machine of the class described, a chuck, means for feeding wire solder from said chuck, a cutter for severing the solder projecting from said chuck, a punch rod, and means for simultaneously operating said cutter and said punch rod.

13. In a machine of the class described, a chuck for holding wire solder, a shaft, a pulley on said shaft for feeding wire solder to said chuck, a sleeve about said shaft, an arm on said sleeve provided with a cutter arranged to move across the end of said chuck, a rocker arm on said sleeve, means for oscillating the rocker arm, and means on said rocker arm for operating said shaft.

14. In a machine of the class described, a chuck for holding wire solder, a shaft, a pulley on said shaft for feeding wire solder to said chuck, a sleeve about said shaft, an arm on said sleeve provided with a cutter arranged to move across the end of said chuck, a rocker arm on said sleeve, means for oscillating the rocker arm, means on said rocker arm for operating said shaft, and means operative during an interruption of the succession of cans for preventing the operation of said shaft.

15. In a machine of the class described, a chuck for holding wire solder, a shaft, a pulley on said shaft for feeding wire solder to said chuck, a sleeve about said shaft, an arm on said sleeve arched about said feed pulley, a cutter on said arm adjacent the end of said chuck, a rocker arm on said sleeve, means for oscillating said rocker arm, means on said rocker arm for intermittently turning said shaft, and means for varying the degree of said turning.

16. In a machine of the class described, a chuck for holding wire solder, a shaft, a pulley on said shaft for feeding wire solder to said chuck, a sleeve about said shaft, an arm on said sleeve provided with a cutter arranged to move across the end of said chuck, a punch rod, an arm on said sleeve connected to said punch rod, a rocker arm on said sleeve, means for oscillating the rocker arm, and means on said rocker arm for operating said shaft.

17. In a machine for operating on a can, a chuck for holding wire solder, a shaft, a pulley on said shaft for feeding wire solder to said chuck, a sleeve about said shaft, an arm on said sleeve provided with a cutter arranged to move across the end of said chuck, a punch rod for perforating the can, an arm on said sleeve connected to said punch rod, a rocker arm on said sleeve, means for oscillating the rocker arm whereby the can is perforated by the punch and a portion of solder is severed by the cutter, means connecting the rocker arm and the shaft whereby the feed pulley is operated to feed solder to said chuck, and means for conducting the severed portion of solder to said can adjacent the perforation.

18. In a machine for operating on a can, a chuck for holding wire solder, a shaft, a pulley on said shaft for feeding wire solder to said chuck, a sleeve about said shaft, an arm on said sleeve provided with a cutter arranged to move across the end of said chuck, a punch rod for perforating the can, an arm on said sleeve connected to said punch rod, a rocker arm on said sleeve, means for oscillating the rocker arm whereby the can is perforated by the punch and a portion of solder is severed by the cutter, means connecting the rocker arm and the shaft whereby the feed pulley is operated to feed solder to said chuck, means for conducting the severed portion of solder to said can adjacent the perforation and means for supplying flux for said solder.

19. In a machine of the class described, a chuck for holding wire solder, a shaft, a pulley on said shaft for feeding wire solder to said chuck, a cutter arranged to move about the axis of said shaft and across the end of the chuck and means for alternately operating said pulley to feed solder out of the end of said chuck and said cutter to sever said projecting solder.

20. In a machine of the class described, a chuck for holding wire solder, a shaft, a wire solder feed pulley on said shaft, a sleeve about said shaft, an arm on said sleeve arched about said feed pulley, a cutter on said arm adjacent the end of said chuck, a punch rod, a bifurcated arm on said sleeve slidably connected to said punch rod, a rocker arm on said sleeve, means for oscillating said rocker arm, means on said rocker arm for intermittently turning said shaft and means for varying the degree of said turning.

21. In a machine of the class described, a punch rod, means for feeding a succession of cans below said punch rod, means for operating said punch rod to perforate the cans and means for simultaneously depositing a portion of solid solder adjacent the perforation.

22. In a machine of the class described, a punch rod, means for feeding a succession of cans below said punch rod, means for operating said punch rod to perforate the cans and means actuated simultaneously with said punch rod for depositing a portion of solid solder and a portion of flux adjacent the perforation.

23. In a machine of the class described, an incoming conveyer, a fixed operating station, means for removing the cans from said incoming conveyer to said station, means for perforating the can tops while the cans rest upon the station, means actuated simultaneously with said perforating means for depositing portions of solder and flux adjacent the perforation and means for removing the cans from the station to an outgoing conveyer.

24. In a machine of the class described, an incoming conveyer, a fixed operating station, means for removing the cans from said incoming conveyer to said station, a punch rod arranged adjacent the station, means for supplying portions of solder and flux arranged adjacent the station, means for simultaneously operating the punch rod to perforate the can, and the solder and flux supply means to deposit portions thereof upon the can, and means for removing the cans from the station to an outgoing conveyer.

25. In a machine of the class described, an incoming conveyer, a fixed operating station, means for removing the cans from said incoming conveyer to said station, means for perforating the can tops while the cans rest upon the station, means actuated simultaneously with the perforating means for depositing a portion of solder adjacent the perforation, means for automatically preventing the deposit of solder in the absence of a can and means for removing the cans from the station to an outgoing conveyer.

In testimony whereof, I have hereunto set my hand at San Francisco, California, this 14th day of April, 1917.

WILLIAM H. PISANI.

In presence of—
H. G. PROST,
C. S. EVANS.

Copies of this patent may be obtained for five cents each, by addressing the "Commissioner of Patents, Washington, D. C."